Patented Jan. 1, 1946

2,392,084

UNITED STATES PATENT OFFICE 2,392,084

PROCESS FOR PREVENTION OF GELATION OF SOLUTIONS OR DISPERSIONS OF PROLAMINES

Cyril D. Evans and Ralph H. Manley, Peoria, Ill., assignors to Claude R. Wickard, as Secretary of Agriculture of the United States of America, and to his successors in office No Drawing. Application February 4, 1942, Serial No. 429,576

2 Claims. (Cl. 106—153)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to a new and useful method of preventing gelation of solutions or dispersions of prolamines, and more particularly to the prevention of gelation of solutions or dispersions of zein and gliadin.

The prolamines such as zein, gliadin, and hordenin, dissolve readily in a large number of single and mixed solvents such as ethylene glycol, glycerol, acetic acid, aniline, acetamide, and in aqueous mixtures of methyl, ethyl, and isopropyl alcohols, acetone, and dioxane. It is not known with any degree of certainty, whether the products thus obtained are true solutions or whether the prolamines are present, in some or in all of them, in colloidal form. In the present specification and claims the terms "dispersion" and "solution" are used synonymously and are meant to include all such liquid mixtures containing the prolamines distributed through the solvent or dispersing medium as a colloid or in the form of a true molecular solution. In all of these solvents, the prolamines tend to set to a gel which is useless for most commercial purposes. The time required for gelation to take place varies widely depending upon such factors as temperature of storage, concentration of the prolamine, and the nature of the solvent system used.

It is well known to those familiar with the preparation of prolamine solutions that rate of gelation may be retarded by storage at low temperatures; by using substantially anhydrous solvents; by the addition of certain reagents to the prolamine solution; or by keeping the concentration of the prolamine at a minimum.

The first of these methods is inadequate as summer room temperatures are frequently sufficiently high to cause commercially usable concentrations of the prolamine to gel from solution in a few days. For example, a solution of 20 grams of dry commercial zein dissolved in 100 cc. of 85 percent aqueous ethyl or isopropyl alcohol may be expected to set to a useless gel in four or five days if stored at 100° F. Likewise, the second method of postponing gelation has its limitations. It is well known that substantially anhydrous zein solutions are in general more resistant to gelation than those containing water, but they are usually considerably more expensive. Twenty grams of dry zein dissolved in 100 cc. of 70 percent aqueous ethyl alcohol, for example, will usually set to a gel in from 7 to 14 days if stored at 25–30° C., whereas 20 grams of dry zein dissolved in 100 cc. of 90 percent aqueous ethyl alcohol will usually remain ungelled for several months when stored at the same temperature.

The third method of stabilizing prolamine solutions, namely that of adding gelation retarders, is unsatisfactory because all of the addition agents which are known to retard gelation must be used in large amounts, and are objectionable either because of cost or health hazard. Such compounds as morpholine, benzene, furfural, and acetaldehyde are helpful in delaying gelation, but are objectionable for the reasons cited above. Thus, acetaldehyde added to aqueous alcoholic solutions of the prolamines may postpone gelation for a period of several months if used in concentrations roughly equal in weight to the weight of the prolamine present in the solution, particularly if the aquosity of the solvent is low. However, such treatment has little effect unless such relatively high concentrations of acetaldehyde or other gelation retarder is added, and is undesirable because of cost and health hazard.

The fourth method, that of controlling the concentration of the prolamine in the solution, is disadvantageous in that it limits the viscosity of the solutions and is uneconomical of solvents. For many commercial purposes it would be desirable to use prolamine concentrations as high as 40 percent, but this is usually entirely impractical because of rapidity of gelation. Commercial solutions of zein, which are frequently made up in 85 percent aqueous isopropyl alcohol, are unstable toward gelation unless their zein concentration is kept below 10 or 12 percent. Likewise in certain substantially anhydrous solvents, concentrations of prolamine which are economical of solvents may be much too viscous for industrial use. For example, the viscosity of a 15 percent solution of zein in anhydrous diethylene glycol is about 1500 centipoise at 20° C., while the viscosity of a 15 percent solution of zein in aqueous 85 percent ethyl alcohol may be about 25 centipoise at the same temperature.

We have discovered that prolamine solutions may be effectively stabilized against gelation by heating them to elevated temperatures. By elevated temperatures we mean temperatures sufficiently high so that the stabilization of the prolamine takes place before the protein has had time to set to a gel.

We have further discovered that the stabilization reaction is facilitated, and the stability of the ensuing solution greatly enhanced, by the presence of an aldehyde. We have found that in the absence of an aldehyde the stabilization reaction takes place before the gelation of the protein occurs, only at temperatures of not less than about 100° C. Therefore when the boiling point of the dispersing medium is substantially below that of water it is necessary to conduct the stabilization process in a closed container under increased pressure, for instance in an autoclave, to prevent substantial evaporation of the dispersing medium.

The stability of prolamine solutions obtained by a thermal treatment in the absence of an aldehyde, is substantially improved if an aldehyde is added to the prolamine solution subsequent to the thermal treatment.

If our stabilization process is carried out in the presence of an aldehyde the tendency of the prolamine solution to gel upon heating is greatly reduced. Therefore the stabilization can be effected by heating the solution in the presence of an aldehyde to lower temperatures over longer periods of time.

We have found however that stabilization of such aldehyde treated prolamine solutions is also effected more rapidly at higher temperatures. Therefore we find it advantageous to operate our process at relatively high temperatures and in order substantially to obviate losses of reactants, due to evaporation, we prefer to carry out the stabilization in the presence of an aldehyde and in a sealed container such as an autoclave.

However, our invention is not limited to such a method of operation. Stabilization may be attained by any of the three modifications of our method, namely:

1. Heating the solution at temperatures of about 100° C. or higher.
2. Heating the solution in the presence of an aldehyde.
3. Adding an aldehyde to the solution obtained according to method 1.

As previously stated any of the above modifications of our invention may be carried out either at atmospheric or under increased pressure.

We have found, for example, that 20 grams of dried commercial zein dissolved in 100 cc. of 80% aqueous ethyl alcohol will usually set to a gel in 5 to 7 days when stored at 40° C., whereas a similar solution which has been heated to 120° C. for 15 minutes in a closed container may after such treatment be stored at 40° C. for 7 to 17 days without showing any signs of gelation. If a solution of 20 grams of dried commercial zein dissolved in 100 cc. of 80% ethyl alcohol is heated at 120° C. for 15 minutes, after which 5 cc. of 37% formaldehyde solution are added, the resulting solution may be stored at 40° C. for 12 to 20 days without setting to a gel. If a solution consisting of 20 grams of dried commercial zein, 100 cc. of 80% ethyl alcohol, and 5 cc. of 37% formaldehyde is heated at 120° C. for 15 minutes, it may be stored at 40° C. for months without showing any sign of gelation.

We have found that this latter treatment effects a high degree of stability against gelation even when as little as 1% of aldehyde and as much as 50% of water are present in the solvent.

Although all three of the above mentioned modifications of our method of treatment effect an increase in stability of the resulting prolamine solutions against gelation, we have found that the treatment which involves heating the zein dispersion to an elevated temperature in the presence of an aldehyde is most effective, and also imparts the maximum degree of water resistance to the zein films made from such solutions.

By virtue of their stability, the prolamine solutions obtained by our method are suitable for use in commercial processing without danger of loss through gelation during use or while in storage, and may be much less expensive to prepare than those in which higher concentrations of alcohol or other substantially non-aqueous solvents are used in order to improve stability toward gelation.

We have found that any organic prolamine dispersing medium is suitable for our process. We may use aliphatic alcohols such as methyl, ethyl, propyl alcohols, aliphatic ketones like acetone, certain organic oxides for instance dioxane, or any other organic solvent which will dissolve the prolamines.

We have found that a wide variety of agents which yield aldehydes, which agents may be aldehydes or substances yielding aldehydes, may be used to impart stability to the prolamine solutions. It is desirable that the aldehyde or substances yielding an aldehyde used be miscible with the other compounds of the solvent mixture. If this requirement is met, any aliphatic, aromatic or heterocyclic aldehyde such as for instance formaldehyde, acetaldehyde, propionaldehyde, butyraldehyde, crotonaldehyde, acrolein, chloral, benzaldehyde, furfuraldehyde, or substances yielding aldehydes either through molecular rearrangement or decomposition, such as hexamethylenetetramine, paraldehyde, glyoxal, dioxane, tetrahydroxydioxane, or acetonyl acetone are effective as stabilizing agents, provided that the mixture has been heated for a sufficient time at the necessary elevated temperature. However, because of their commercial availability and because of their effectiveness in imparting stability against gelation, we prefer to use formaldehyde, acetaldehyde, or butyraldehyde.

Prolamine solutions treated according to our process are not only substantially non-gelling, but films produced from the aldehyde-heat stabilized solutions are superior in smoothness and water-resistance, are lighter in color, and are more flexible than prolamine films produced from ordinary solvents.

As an illustration of the manner in which our invention may be practiced, we give the following examples, although the exact details presented are to be considered in no way restrictive.

Example I

If twenty grams of zein are dissolved in 100 cc. of aqueous 80% (by weight) ethyl alcohol and then autoclaved for 15 minutes at 120° C., a clear homogeneous solution will result which is stable when stored at 40° C. for 7 to 17 days. A similar solution which has not been heated will gel within less than a week when stored at 40° C.

Example II

Twenty grams of zein are dissolved in 100 cc. of aqueous 80% (by weight) ethyl alcohol, and the solution is then autoclaved for 15 minutes at 120° C., after which 5 cc. of 37% formalin are added. The resulting solution is clear and homogeneous, and is stable for 12 to 20 days at 40° C. A similar solution which has not been heated but to which 5 cc. of 37% formaldehyde have been added will gel within 5 to 7 days when stored at 40° C.

Example III

Twenty grams of dry zein are dissolved in a mixture of 95 cc. of aqueous 80% ethyl alcohol (by weight) and 5 cc. of commercial 37% formaldehyde solution. Then we may heat this mixture in a sealed container, the temperature of the mixture being held at 120° C. for 15 minutes. After cooling and removing from the pressure container, we find that the treated zein solution is clear and homogeneous, and that it may be stored for months at room temperature or higher without setting to a useless, irreversible gel, whereas the same solution, if not heated, could be expected to set to a gel in two weeks or less when stored under the same conditions. Furthermore, we find that the low concentration of aldehyde needed by our method, coupled with the reaction which it undergoes with the zein while being heated in the sealed container results in a stabilized zein solution having only a small amount of the objectionable aldehyde odor.

A similar but still more stable dispersion may be obtained if a larger amount of formaldehyde solution is used.

Example IV

Twenty grams of zein are dissolved in 95 cc. of aqueous 80% (by weight) ethyl alcohol and 3 cc. of commercial acetaldehyde. This mixture is then heated in a sealed container for 15 minutes at 120° C. Upon cooling and removal from the pressure chamber it can be stored for months at 40° C. without gelation. A similar solution of zein which has not been given the heat treatment will set to a gel within a week when stored at the same temperature.

Example V

Longer periods of autoclaving are in no way detrimental to the process if an increased amount of aldehyde is used. Twenty grams of zein may be dissolved in 92.5 cc. of aqueous 65% (by weight) ethyl alcohol to which 7.5 cc. of acetaldehyde have been added. This solution may then be autoclaved for 60 minutes at 120° C. to form a clear and homogeneous dispersion which will be stable for months at temperatures to 40° C. or higher. A similar solution, but not heated, may be expected to gel within 2 to 7 days, when stored at 40° C.

Example VI

Twenty grams of zein are dissolved in 95 cc. of 80% (by weight) ethyl alcohol to which 5 cc. of butyraldehyde are added, and the solution is then autoclaved for 15 minutes at 120° C. The resulting solution is perfectly clear and homogeneous and is stable for months. However, the same solutions when not given the heat treatment will be found to gel within a week when stored at 40° C.

Example VII

Twenty grams of zein are dissolved in 95 cc. of aqueous 55% (by weight) ethyl alcohol and 5 cc. of 37% formaldehyde. If this solution is then autoclaved at 120° C. for 15 minutes, the resulting solution will be clear, homogeneous and stable for months at temperatures to 40° C. or higher. A similar solution which has not been heated but stored under the same conditions will gel within a week.

Example VIII

Twenty grams of zein are dissolved in 95 cc. of aqueous 70% (by weight) acetone and 5 cc. of 37% formaldehyde solution. This solution is then autoclaved at 120° C. for 15 minutes. The resulting solution is clear, homogeneous and stable for months at temperatures to 40° C. or higher. A similar solution, which contains no aldehyde and which has not been heated will gel within a few days when stored at 40° C.

Example IX

Twenty grams of zein are dissolved in 95 cc. of aqueous 70% (by weight) dioxane and 5 cc. of 37% formaldehyde solution. This solution is then autoclaved for 15 minutes at 120° C. The resulting solution is clear, homogeneous and stable for months at temperatures to 40° C. or higher. A similar solution which has not been heated but stored under the same conditions will gel within a week.

We claim:

1. A process for stabilizing a dispersion of prolamine in a liquid organic dispersing medium against gelation when stored, consisting of heating said dispersion at a temperature not less than about 100° C. and under such conditions of pressure and time that evaporation of the dispersing medium is not substantial and the dispersion is stabilized without setting the prolamine as a gel.

2. The process of claim 1, wherein the prolamine is zein.

CYRIL D. EVANS.
RALPH H. MANLEY.